United States Patent
Lee (10) Patent No.: US 7,317,669 B2
(45) Date of Patent: Jan. 8, 2008

(54) METHOD AND APPARATUS FOR COMPENSATING FOR DISC ECCENTRICITY IN OPTICAL DISC SERVO SYSTEM

(75) Inventor: Dong-Jin Lee, Seongnam-si (KR)

(73) Assignee: Samsung Electornics Co., Ltd., Suwon-Si (KR)

( * ) Notice: Subject to any disclaimer, the term of this patent is extended or adjusted under 35 U.S.C. 154(b) by 605 days.

(21) Appl. No.: 10/894,360

(22) Filed: Jul. 20, 2004

(65) Prior Publication Data
US 2005/0078573 A1     Apr. 14, 2005

(30) Foreign Application Priority Data
Jul. 23, 2003    (KR) .................. 10-2003-0050506

(51) Int. Cl.
*G11B 7/00*    (2006.01)
(52) U.S. Cl. .................. 369/44.29; 369/44.32; 369/44.35; 369/53.14
(58) Field of Classification Search .......... 369/44.32, 369/44.29, 44.35, 53.14
See application file for complete search history.

(56) References Cited

U.S. PATENT DOCUMENTS

| | | | | |
|---|---|---|---|---|
| 5,615,191 A | * | 3/1997 | Takeda et al. ......... | 360/77.04 |
| 5,933,397 A | * | 8/1999 | Yamashita et al. ....... | 369/44.28 |
| 6,118,739 A | * | 9/2000 | Kishinami et al. ....... | 369/44.32 |
| 6,498,772 B1 | * | 12/2002 | Fujiune et al. .......... | 369/44.29 |
| 7,012,778 B2 | * | 3/2006 | Shigematsu ............. | 360/77.04 |
| 2004/0213108 A1 | * | 10/2004 | Fujiune ................... | 369/53.14 |

FOREIGN PATENT DOCUMENTS

| | | | |
|---|---|---|---|
| JP | 60185253 A | * | 9/1985 |
| JP | 07-182676 | | 7/1995 |
| JP | 2003-30877 | | 1/2003 |
| KR | 2003-7197 | | 1/2003 |

* cited by examiner

*Primary Examiner*—Thang V. Tran
(74) *Attorney, Agent, or Firm*—Staas & Halsey LLP (57) ABSTRACT

A method and apparatus compensating for disc eccentricity includes extracting eccentricity data from a tracking error signal having one period, generated by a tracking servo, detecting parameter values of an eccentricity component extracted during the extraction of the eccentricity data and transforming a reference sine wave based on the detected parameter values of the eccentricity component. The eccentricity data is replaced with the transformed reference sine wave and the replaced eccentricity data is added to the tracking error signal to compensate for the disc eccentricity.

14 Claims, 5 Drawing Sheets

METHOD AND APPARATUS FOR COMPENSATING FOR DISC ECCENTRICITY IN OPTICAL DISC SERVO SYSTEM

CROSS-REFERENCE TO RELATED APPLICATIONS

This application claims the priority of Korean Patent Application No. 2003-50506, filed on Jul. 23, 2003, in the Korean Intellectual Property Office, the disclosure of which is hereby incorporated by reference in its entirety.

BACKGROUND OF THE INVENTION

1. Field of the Invention

The present invention relates to an optical disc driving system, and more particularly, to a method and apparatus for compensating for eccentricity of an optical recording medium during data recording/reproducing.

2. Description of the Related Art

In general, disc eccentricity is the major disturbance component in an optical disc servo system.

FIGS. 1A through 1D illustrate track shapes of a non-eccentric disc and an eccentric disc and waveforms of tracking error signals detected for the two discs.

Figure 1A:
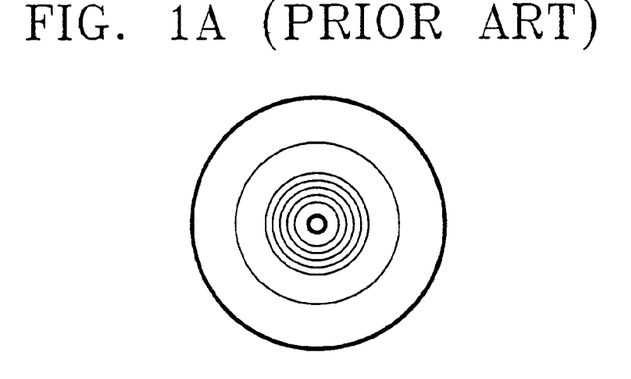
FIGS. 1A through 1D illustrate track shapes of a non-eccentric disc and an eccentric disc and waveforms of tracking error signals detected for the two discs.
Figure 1B:
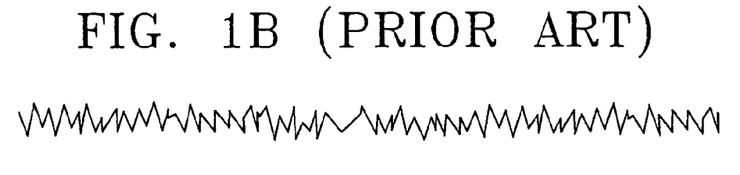
Figure 1C:
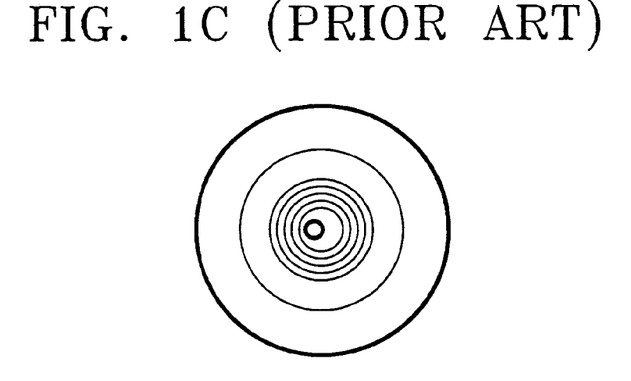
Figure 1D:
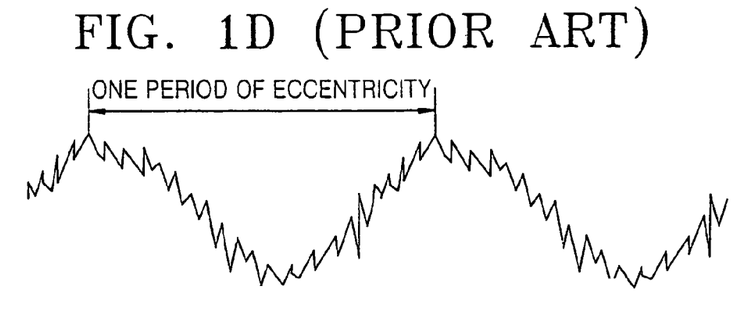

FIG. 1A shows a normal optical disc that has no eccentricity component and FIG. 1B illustrates the waveform of the tracking error signal detected for the non-eccentric disc of FIG. 1A. FIG. 1C shows an optical disc that has an eccentricity component and FIG. 1D illustrates the waveform of the tracking error signal detected for the eccentric disc of FIG. 1C.

Typically, optical discs should be manufactured without any eccentricities. However, due to technical problems in disc manufacturing such as poor manufacturing conditions, most optical discs have eccentricity components as shown in FIG. 1C. In practice, a specific amount of eccentricity is allowed when a recording format of an optical disc is determined. In the case of compact discs (CDs), an eccentricity of maximum 280 μm is allowed. If a disc is eccentric, an eccentricity component due to the eccentricity of the disc can be identified in a disc tracking error signal, as shown in FIG. 1D. As a result, optical disc reproducing apparatuses cannot approximately control a tracking operation due to such eccentricity components. Thus, disc eccentricity should be compensated for.

Figure 2:
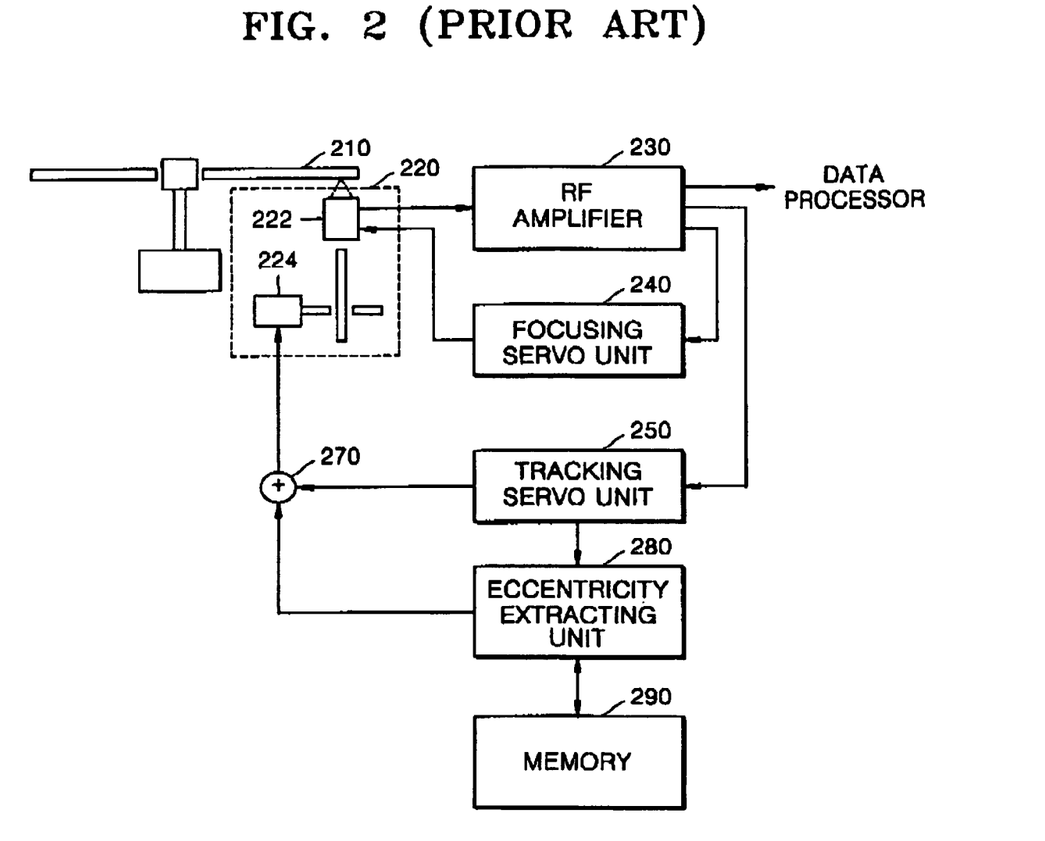
FIG. 2 is a block diagram of a conventional optical disc driving apparatus having an eccentricity compensating function.

FIG. 2 is a block diagram of a conventional optical disc driving apparatus having an eccentricity compensating function.

First, a radio frequency (RF) amplifying unit 230 amplifies an RF signal read by a pickup 220 and detects a tracking error signal and a focusing error signal from the amplified RF signal. A focusing servo unit 240 receives the focusing error signal detected by the RF amplifying unit 230 and generates a focusing servo control signal. A tracking servo unit 250 receives the tracking error signal detected by the RF amplifying unit 230 and generates a tracking servo control signal. A focus actuator 222 in the pickup 220 causes a laser beam emitted from the pickup 220 to be focused onto a disc 210 according to the focusing servo control signal generated by the focusing servo unit 240. A tracking actuator 224 in the pickup 220 causes the laser beam to follow tracks of the disc 210 according to the tracking servo control signal generated by the tracking servo unit 250. The RF amplifying unit 230 amplifies a recording signal obtained from the disc 210 in accordance with the focusing error signal and the tracking error signal. The recording signal is transmitted to a data processor (not shown) and the data processor outputs an audio signal or a video signal after performing an error correction operation. An eccentricity extracting unit 280 extracts eccentricity data corresponding to the tracking error signal of one period that is generated by the tracking servo unit 250. A memory 290 stores the eccentricity data extracted by the eccentricity extracting unit 280. An adder 270 adds the eccentricity data stored in the memory 290 to the tracking error signal during every sampling period, thereby compensating for the eccentricity of the disc 210.

However, the conventional optical disc driving apparatus of FIG. 2 is disadvantageous in that disturbance components such as disc defects are added to the original eccentricity component and have a negative influence upon an overall servo control.

SUMMARY OF THE INVENTION

The present invention provides a method and apparatus accurately performing disc eccentricity compensation in an optical disc servo system by replacing an eccentricity component with a reference sine wave.

The present invention also provides an optical disc servo system using the method and apparatus for accurately compensating for disc eccentricity.

According to one aspect of the present invention, there is provided a method for compensating for disc eccentricity in an optical disc recording/reproducing servo system. The method comprises extracting eccentricity data from a tracking error signal having one period, the tracking error signal being generated by a tracking servo; measuring parameter values of an eccentricity component extracted during the extraction of the eccentricity data; transforming a reference sine wave based on the measured parameter values of the eccentricity component; replacing the eccentricity data with the transformed reference sine wave; and adding the replaced eccentricity data to the tracking error signal to compensate for the disc eccentricity.

According to another aspect of the present invention, there is provided an apparatus for compensating for disc eccentricity. The apparatus comprises an eccentricity processor and an adder. The eccentricity processor detects parameter values of an eccentricity component by extracting eccentricity data from a tracking error signal having one period, transforms the eccentricity component to a reference sine wave based on the detected parameter values of the eccentricity component, and replaces the eccentricity data with the reference sine wave. The adder adds the eccentricity data replaced in the eccentricity processor and the tracking error signal to compensate for the disc eccentricity.

According to still another aspect of the present invention, there is provided an optical disc servo system comprising a pickup, a radio frequency (RF) amplifier, a focusing servo unit, a tracking servo unit, an eccentricity processor, and an adder. The RF amplifier detects a focusing error signal and a tracking error signal from a signal read from an optical disc by the pickup. The focusing servo unit receives the focusing error signal detected by the RF amplifier and controls focusing servo. The tracking servo unit receives the tracking error signal detected by the RF amplifier and controls tracking servo. The eccentricity processor stores an eccentricity component with respect to the tracking error signal having one period that is generated by the tracking servo unit, transforms the eccentricity component to a reference sine wave based on frequency, gain, and phase values of the stored eccentricity component, and replaces the eccentricity component with the mapped reference sine wave. The adder adds the eccentricity component processed by the eccentricity processor and the tracking error signal during every sampling period and provides an addition result to the pickup.

According to another aspect of the present invention, there is provided a computer readable medium encoded with processing instructions for performing a method of compensating disc eccentricity, the method including extracting eccentricity data from a tracking error signal having one period, the tracking error signal being generated by a tracking servo; measuring parameter values of an eccentricity component extracted during the extraction of the eccentricity data; transforming a reference sine wave based on the measured parameter values of the eccentricity component; replacing the eccentricity data with the transformed reference sine wave; and adding the replaced eccentricity data to the tracking error signal to compensate for the disc eccentricity.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail an exemplary embodiment thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
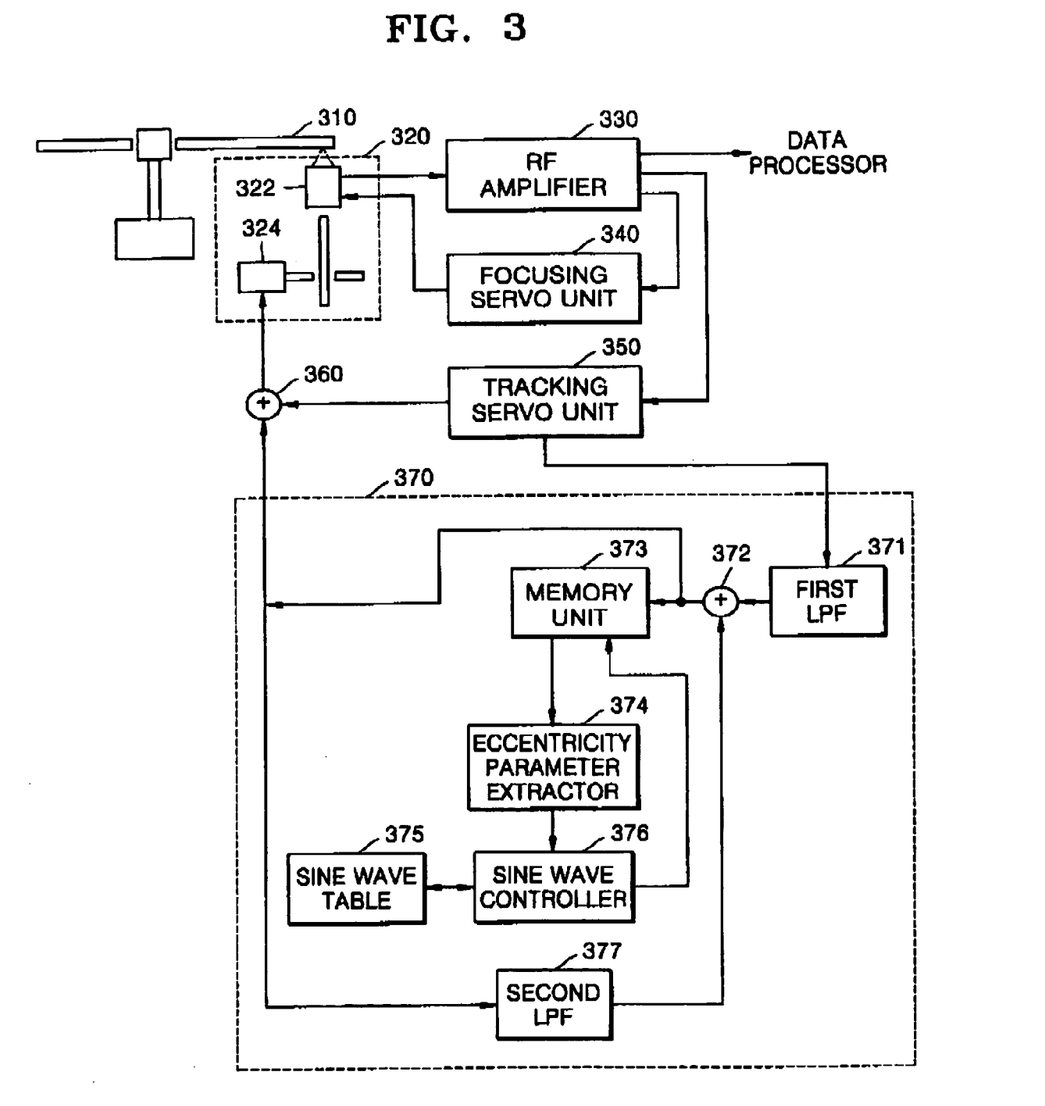
FIG. 3 is a block diagram of an optical disc driving apparatus having an eccentricity compensation function according to the present invention.

FIG. 3 is a block diagram of an optical disc driving apparatus having an eccentricity compensation function according to the present invention.

First, an RF amplifying unit 330 amplifies an RF signal read by a pickup 320 and detects a tracking error signal and a focusing error signal from the amplified RF signal.

A focusing servo unit 340 receives the focusing error signal detected by the RF amplifying unit 330 and generates a focusing servo control signal. A tracking servo unit 350 receives the tracking error signal detected by the RF amplifying unit 330 and generates a tracking servo control signal. A focus actuator 322 in the pickup 320 causes a laser beam emitted from the pickup 320 to be focused onto a disc 310 according to the focusing servo control signal. A tracking actuator 324 in the pickup 320 causes the laser beam to follow tracks of the disc 310 according to the tracking servo control signal. The RF amplifying unit 330 amplifies a recording signal obtained from the disc 310 in accordance with the focusing error signal and the tracking error signal. The recording signal is transmitted to a data processor (not shown) and the data processor outputs an audio signal or a video signal after performing an error correction operation.

An eccentricity processing unit 370 stores an eccentricity component with respect to the tracking error signal of one period, which corresponds to one rotation and is generated by the tracking servo unit 350. The eccentricity processing unit 370 transforms a reference sine wave with respect to the frequency, gain, and phase information of the stored eccentricity component and replaces the original eccentricity component with the transformed reference sine wave.

An adder 360 adds the eccentricity component output from the eccentricity processing unit 370 to the tracking error signal during every sampling period to compensate for disc eccentricity and outputs the eccentricity-compensated tracking error signal to the tracking actuator 324 in the pickup 320.

Hereinafter, the eccentricity processing unit 370 will be described in detail.

A sine wave table 375 stores data corresponding to the reference sine wave. The adder 372, a first low pass filter (LPF) 371, and a second LPF 377 serve as a feed-forward control module for extracting and updating the eccentricity component. In other words, the first LPF 371 low-pass filters the input tracking servo control signal. The second LPF 377 low-pass filters the output eccentricity component. The adder 372 adds output values of the first LPF 371 and the second LPF 377, thereby extracting the eccentricity component. In the present invention, although not shown in the figures, an analog-to-digital converter (ADC) is further included to convert the eccentricity component output from the adder 372 into a digital signal. A memory 373 stores eccentricity data output from the adder 372. Here, disturbance components such as disc defects are added to the eccentricity data stored in the memory 373. An eccentricity parameter extractor 374 measures the frequency, gain, and phase of the eccentricity data having one period, which is stored in the memory 373, and stores the measured frequency, gain, and phase in a specific register. A sine wave controller 376 transforms the reference sine wave stored in the sine wave table 375 according to the frequency, gain, and phase measured by the eccentricity parameter extractor 374, replaces the eccentricity data with the transformed reference sine wave, and stores the transformed reference sine wave. Thus, the memory 373 stores eccentricity data that has no disturbance.

Figure 4:
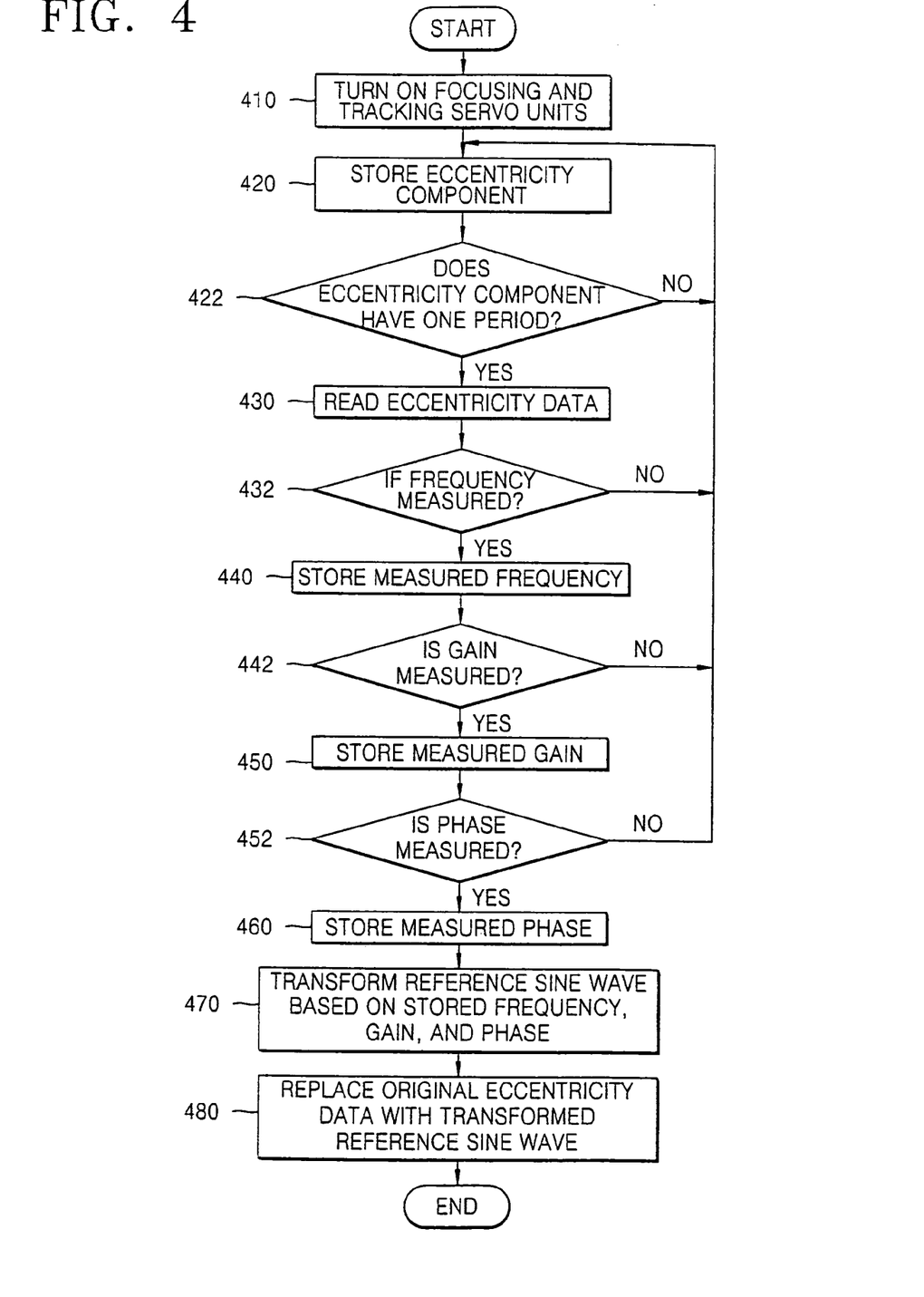
FIG. 4 is a flowchart illustrating a method of compensating for disc eccentricity.

FIG. 4 is a flowchart illustrating a method of compensating for disc eccentricity according to the present invention.

In the first operation 410, a focusing servo unit and a tracking servo unit are turned on and a focusing error signal and a tracking error signal are generated.

In operations 420 and 422, an eccentricity component having one period included in the tracking error signal is extracted by a feed-forward control module and the extracted eccentricity component is stored in a memory.

In operation 430, once the eccentricity component having one period is stored, eccentricity data is read and the frequency, gain, and phase of the eccentricity data are measured.

After the frequency is measured in operation 432, the measured frequency is stored in a specific register in operation 440. Also, after the gain is measured in operation 442, the measured gain is stored in the specific register. After the phase is measured in operation 452, the measured phase is stored in the specific register in operation 460.

In operation 470, the original eccentricity component is replaced with the reference sine wave based on the frequency, gain, and phase stored in the specific register. For example, if the frequency, gain, and phase are 1 Khz, 0.1 dB, and 90°, the reference sine wave is transformed into a sine wave to which the frequency, gain, and phase are applied.

In operation 480, the original eccentricity data is replaced with data corresponding to the transformed reference sine wave.

Then, the replaced eccentricity component is added to the tracking error signal during every sampling period.

Figure 5A:
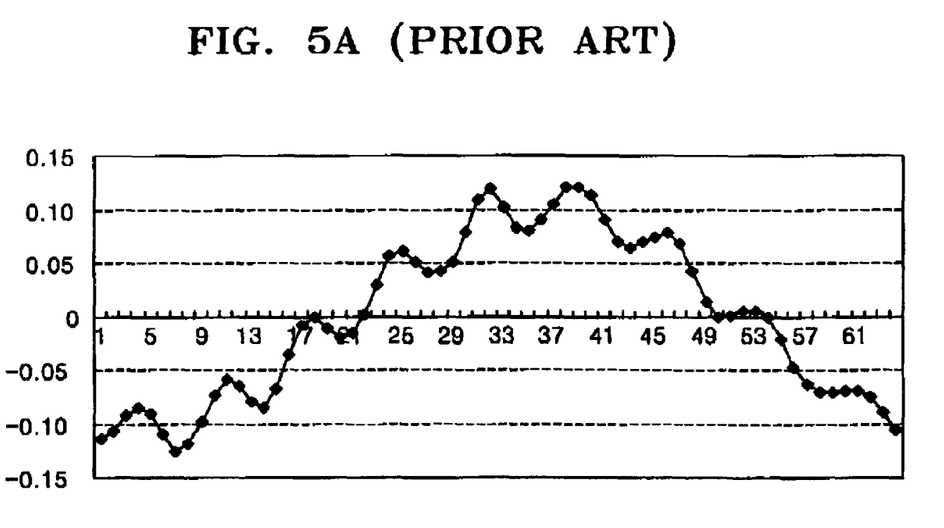
FIGS. 5A and 5B illustrate waveforms of a conventional eccentricity signal and an eccentricity signal according to the present invention.
Figure 5B:
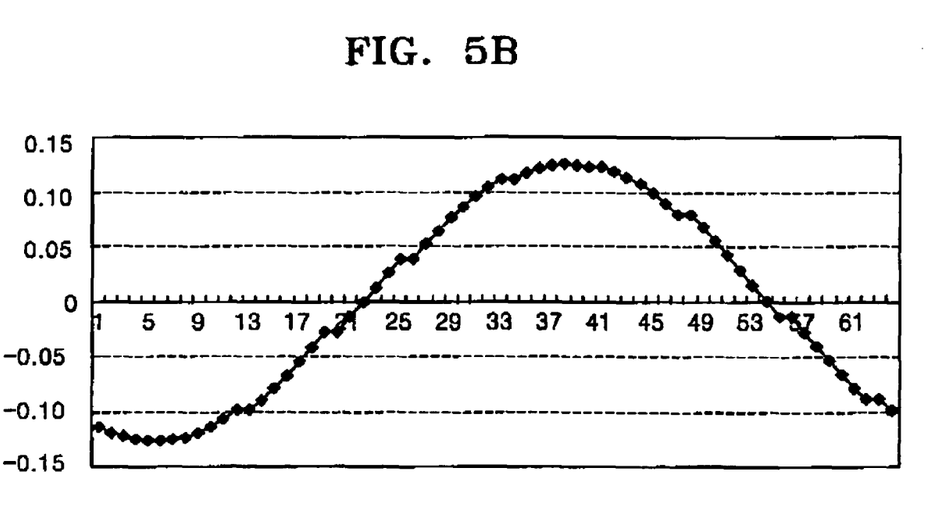

FIGS. 5A and 5B illustrate waveforms of a conventional eccentricity signal and an eccentricity signal according to the present invention, respectively.

As shown in FIGS. 5A and 5B, an eccentricity signal having a disturbance component is replaced with a mapped sine wave as shown in FIG. 5B.

As described above, according to the present invention, by mapping input eccentricity data and a reference sine wave, it is possible to accurately extract an eccentricity signal and achieve a stable disc servo.

The aforementioned method of compensating disc eccentricity may be embodied as a computer program that can be run by a computer, which can be a general or special purpose computer. Thus, it is understood that the apparatus for compensating disc eccentricity can be such a computer. Computer programmers in the art can easily reason codes and code segments, which constitute the computer program. The program is stored in a computer readable medium readable by the computer. When the program is read and run by a computer, the method of controlling the apparatus is performed. Here, the computer-readable medium may be a magnetic recording medium, an optical recording medium, a carrier wave, firmware, or other recordable media.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. A method of compensating for disc eccentricity in an optical disc recording/reproducing servo system, the method comprising:
   extracting eccentricity data from a tracking error signal having one period, the tracking error signal being generated by a tracking servo;
   measuring parameter values of an eccentricity component extracted during the extraction of the eccentricity data;
   transforming a reference sine wave based on the measured parameter values of the eccentricity component;
   replacing the eccentricity data with the transformed reference sine wave; and
   adding the replaced eccentricity data to the tracking error signal to compensate for the disc eccentricity.

2. The method of claim 1, wherein the detected parameter values of the eccentricity component are frequency, gain, and phase values.

3. An apparatus compensating for disc eccentricity, the apparatus comprising:
   an eccentricity processor, which detects parameter values of an eccentricity component by extracting eccentricity data from a tracking error signal having one period, transforms the eccentricity component to a reference sine wave based on the detected parameter values of the eccentricity component, and replaces the eccentricity data with the reference sine wave; and
   an adder, which adds the eccentricity data replaced in the eccentricity processor and the tracking error signal to compensate for the disc eccentricity.

4. The apparatus of claim 3, wherein the eccentricity processor comprises:
   a sine wave table unit, which stores reference sine wave data;
   a memory unit, which stores the eccentricity component extracted from the tracking error signal;
   an eccentricity parameter extracting unit, which extracts frequency, gain, and phase information from the eccentricity component stored in the memory unit; and
   a sine wave control unit, which transforms the reference sine wave stored in the sine wave table unit based on the frequency, gain, and phase information extracted by the eccentricity parameter extracting unit and replaces the eccentricity component stored in the memory unit with the transformed reference sine wave.

5. The apparatus of claim 3, wherein the eccentricity processing means further comprises an adding unit that adds a value obtained by filtering the tracking error signal by a predetermined passband and a value obtained by filtering the eccentricity component stored in the memory unit by the predetermined passband and outputs an updated eccentricity component to the memory unit.

6. An optical disc servo system comprising:
   a pickup;
   a radio frequency (RF) amplifying unit, which detects a focusing error signal and a tracking error signal from a signal read from an optical disc by the pickup;
   a focusing servo unit, which receives the focusing error signal detected by the RF amplifying unit and controls focusing servo;
   a tracking servo unit, which receives the tracking error signal detected by the RF amplifying unit and controls tracking servo;
   an eccentricity processor, which stores an eccentricity component with respect to the tracking error signal having one period that is generated by the tracking servo unit, transforms the eccentricity component to a reference sine wave based on frequency, gain, and phase values of the stored eccentricity component, and replaces the eccentricity component with the mapped reference sine wave; and
   an adder, which adds the eccentricity component processed by the eccentricity processor and the tracking error signal during every sampling period and provides an addition result to the pickup.

7. A method of compensating disc eccentricity, the method comprising:
   generating a focusing error signal and a tracking error signal;
   extracting an eccentricity component having one period included in the tracking error signal and storing the extracted eccentricity component;
   reading and measuring frequency, gain, and phase information of the eccentricity component;
   generating a reference sine wave based on the frequency, gain and phase information;
   replacing the eccentricity component with the reference sine wave based on the frequency, gain and phase; and adding the sine wave to the tracking error signal during every sampling period.

8. An apparatus compensating disc eccentricity, the apparatus comprising:

a eccentricity processing means for detecting parameter values of an eccentricity component by extracting eccentricity data from a tracking error signal having one period, transforming the eccentricity component to a reference sine wave base on the detected parameter values of the eccentricity component, and replacing the eccentricity data with the reference sine wave; and an adder adding the eccentricity data replaced in the eccentricity processor and the tracking error signal to compensate for the disc eccentricity.

9. The apparatus of claim 8, wherein the eccentricity processing means comprises:

a sine wave table unit storing reference sine wave data;

a memory unit storing the eccentricity component extracted from the tracking error signal;

an eccentricity parameter extracting unit extracting frequency, gain, and phase information from the eccentricity component stored in the memory unit; and a sine wave control unit transforming the reference sine wave stored in the sine wave table unit based on the frequency, gain, and phase information extracted by the eccentricity parameter extracting unit and replacing the eccentricity component stored in the memory unit with the transformed reference sine wave.

10. The apparatus of claim 9, wherein the eccentricity processing means further comprises an adder adding a value obtained by filtering the tracking error signal by a predetermined passband and a value obtained by filtering the eccentricity component stored in the memory unit by the predetermined passband and outputting an updated eccentricity component to the memory unit.

11. A computer readable medium encoded with processing instructions for performing a method of compensating disc eccentricity, the method comprising:

extracting eccentricity data from a tracking error signal having one period, the tracking error signal being generated by a tracking servo;

measuring parameter values of an eccentricity component extracted during the extraction of the eccentricity data;

transforming a reference sine wave based on the measured parameter values of the eccentricity component;

replacing the eccentricity data with the transformed reference sine wave; and adding the replaced eccentricity data to the tracking error signal to compensate for the disc eccentricity.

12. The computer readable medium of claim 11, wherein the detected parameter values of the eccentricity component are frequency, gain, and phase values.

13. The computer readable medium of claim 12, wherein the frequency, the gain and the phase values are stored in specific registers.

14. The method of claim 2, wherein the frequency, the gain and the phase values are stored in specific registers.

* * * * *

UNITED STATES PATENT AND TRADEMARK OFFICE
CERTIFICATE OF CORRECTION

PATENT NO. : 7,317,669 B2 Page 1 of 1
APPLICATION NO. : 10/894360
DATED : January 8, 2008
INVENTOR(S) : Dong-jin Lee

It is certified that error appears in the above-identified patent and that said Letters Patent is hereby corrected as shown below:

Title Page, Item (73) (Assignee), change "Electornics" to --Electronics--.

Column 7, Line 5, change "a" to --an--.

Signed and Sealed this

Twenty-seventh Day of May, 2008

JON W. DUDAS
*Director of the United States Patent and Trademark Office*